June 30, 1959 W. C. RUDD 2,892,914
METHODS AND APPARATUS FOR BUTT WELDING
Filed July 2, 1958 2 Sheets-Sheet 1
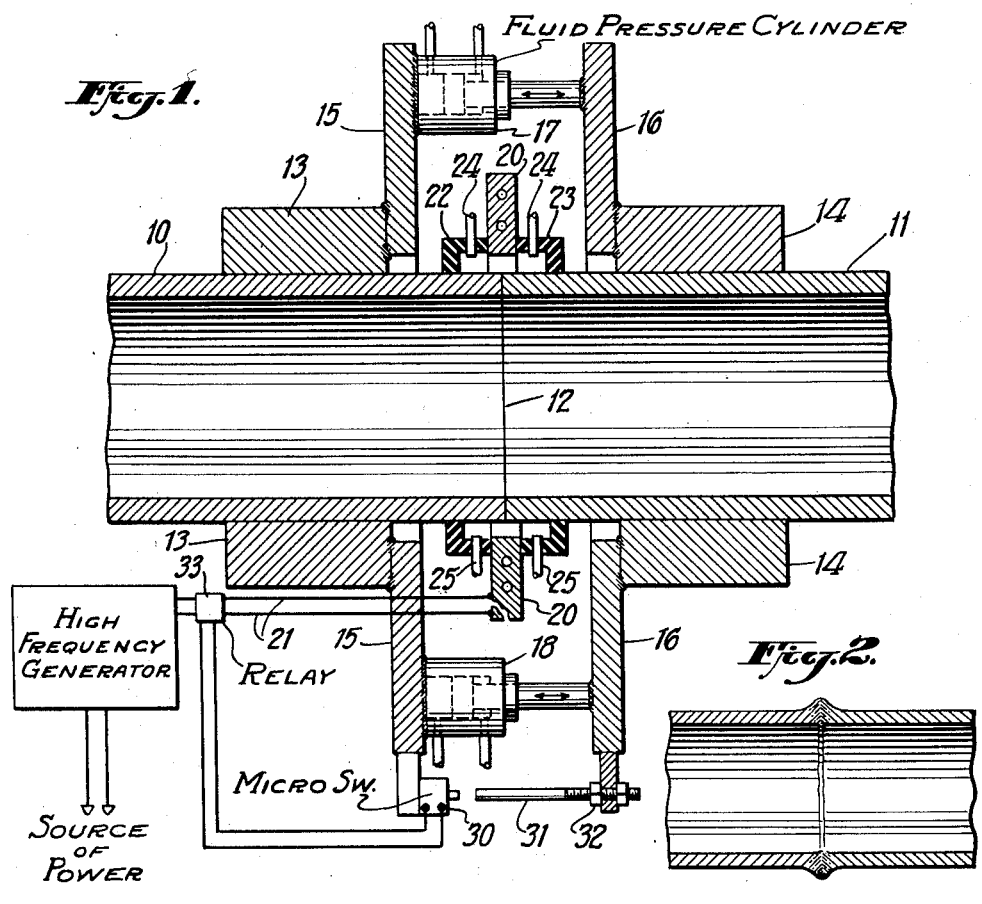
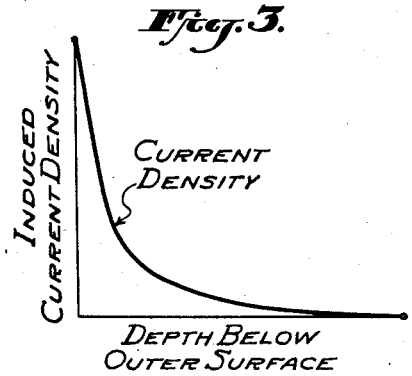
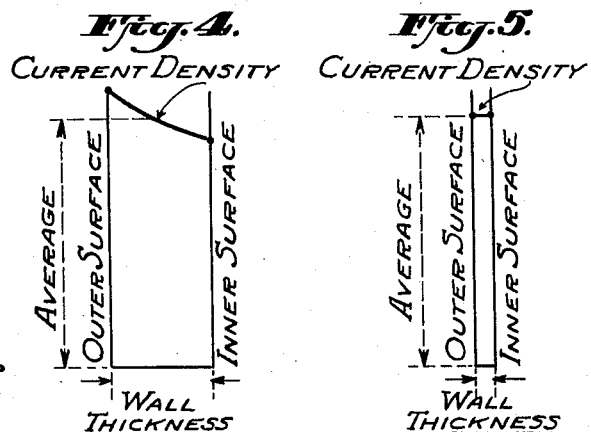
INVENTOR.
WALLACE C. RUDD.
BY
ATTORNEYS.

June 30, 1959 W. C. RUDD 2,892,914
METHODS AND APPARATUS FOR BUTT WELDING
Filed July 2, 1958 2 Sheets-Sheet 2
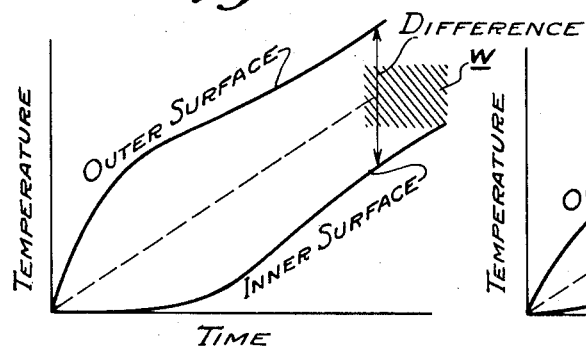
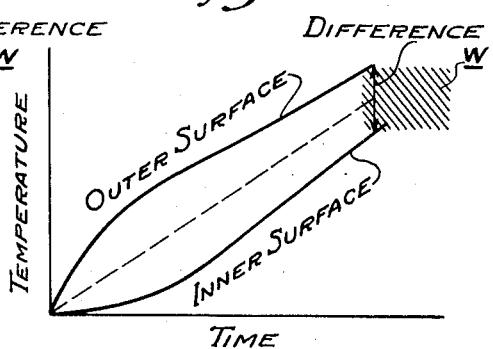
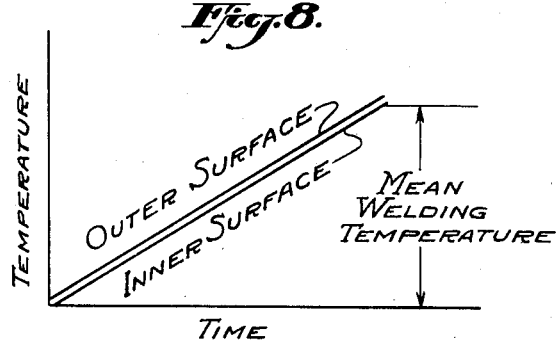
INVENTOR.
WALLACE C. RUDD.
BY
ATTORNEYS.

2,892,914
METHODS AND APPARATUS FOR BUTT WELDING

Wallace C. Rudd, Larchmont, N.Y., assignor to Magnetic Heating Corp., New Rochelle, N.Y., a corporation of New York Application July 2, 1958, Serial No. 746,301

6 Claims. (Cl. 219—9.5)

This invention relates to methods and apparatus particularly adapted for the welding together of the opposed ends of pieces of pipe or tubing such as tubing of steel, aluminum or other metals, or alloys thereof, and in such manner that the upset of the weld will largely occur on the exterior surfaces of the pipe and to a substantially negligible or unobjectionable degree on the interior thereof.

The invention in some of its aspects is also similarly applicable to the butt welding of metal strip ends or edges, or the like, where it is desired to control the upset at the weld line, so that it will occur largely or wholly on one surface rather than the other surface of the assembly of parts.

It has heretofore been proposed to butt weld together abutting ends of pipe and the like by holding the pieces of pipe together end to end and by heating the annular zone of the desired weld around the pipe ends by electromagnetic induction through the use of a "coil" of one or more turns encircling such zone and supplied with current from a high frequency source. With all such methods, however, as proposed prior to the present invention insofar as applicant is aware, the pipe walls at the region of the weld became upset during the welding in such manner that both internal and external bulges were formed, unless possibly if the entire wall thickness were so heated over a zone of sufficient width and in such manner that the entire wall bulges in one direction or the other or unless the abutting ends were shaped prior to welding so as to protrude inwardly or outwardly to a substantial degree. But these latter possibilities leave objectionable irregularities on the interior of the pipe.

In many cases it is highly important to weld lengths of pipe together end to end in such manner that the interior surface thereof at the zone of the weld will be quite smooth or at least have no more than a negligible or unobjectionable upset or bulge. This is for the reason that such bulges or irregularities may seriously interfere with the free flow of fluids through the pipe and particularly where the pipe is used for carrying high pressure flows of liquid as through pipe lines where there may be a great many welded joints over a long distance. Also it is important to avoid such internal upsets or bulges of the metal in the pipe or tubing when used for enclosing electrical cables or other things within the pipe which may have to be drawn into or through considerable lengths of the pipe and which would be marred, scratched or injured in the course of so doing. And in the case of cables, it is desirable that the internal upsets be avoided also in order to avoid variations in the electrical characteristics of the assembly from point to point.

With the present invention, applicant has found it possible by high frequency induction heating, however, to form butt welds of pipe ends of a high quality and yet with the upset confined to the exterior of the pipe, leaving the interior surfaces free of irregularities at the weld zones. In summary, applicant has found this to be possible by proper control of the frequency of the induction heating current used, the effective power density established within various portions of the pipe walls at the desired welding zone and by terminating the heating preferably automatically at the proper moment. To this end, the zone on the abutting pipe ends to be welded is inductively heated with a very high rate of temperature rise and so that the outside becomes somewhat hotter than the inside surface and whereby the outside surface portions become somewhat more plastic than the inner portions, causing the upset to go outwardly rather than inwardly. In other words, the inner portions are slightly more rigid at the time the weld is formed and the heating is discontinued, than the outer portions of the wall, thereby forcing the upset outwardly.

Preferably in accordance with the invention, the pieces of pipe are held together end to end preferably under a predetermined pressure as by the use of clamps which grip the pipe ends and which are pulled together as by the use of gas or liquid pressure piston and cylinder devices. Then an electromagnetic field created by an induction heating coil of one or more turns externally of the pipe, induces currents in the walls of the abutting ends of a frequency and power density to heat such ends rapidly throughout to welding temperature, but with the temperature of the external portions somewhat higher than the internal portions. And such heating is maintained until the ends are softened to an extent such that the aforesaid pressure moves the pieces of pipe substantially toward each other and then preferably such movement is utilized automatically, as by actuating a microswitch or other circuit controlling means, to check or cut off the heating current and stop or substantially discontinue the resulting heating before the exterior portions of the abutting ends become substantially molten or too soft for a good weld and before the metal is upset substantially inwardly of the pipe.

After brief experience with a given arrangement of the apparatus for pipe of a particular type and dimensions, the timing of the heating period need not necessarily be automatically controlled by the movement of the pieces of pipe toward each other, but may be otherwise timed either manually or by a conventional type of automatic timing switch or possibly by the application of cooling means or medium. However, the utilization of the movement of the pieces of pipe toward each other after softening of the metal at the welding zone is a highly advantageous and reliable method for controlling the termination of the heating period, particularly if there is any liability that the prevailing conditions may change somewhat from time to time.

It would normally be assumed, if the pipe ends are heated enough to cause some softening throughout the end edges to welding temperature and to permit the pieces of pipe to be thrust closer together, that as a consequence, there would necessarily be some substantial upsetting of the metal inwardly of the pipe as well as outwardly. It has, however, been found that by practicing the present invention, any such inward upsetting may be avoided to a surprisingly effective and satisfactory degree.

In the case of butt welding of strips and the like, a similar apparatus and method may be used but having the parts appropriately shaped to accommodate and hold the strips in lieu of pieces of pipe.

Various further and more specific objects, features and advantages of the invention will appear from the description given below, taken in connection with the accompanying drawings, illustrating by way of example preferred forms of the invention.

In the drawings:

Fig. 1 is a somewhat schematic view of an arrangement of apparatus for carrying out the invention;

Fig. 2 is a longitudinal sectional view showing the formation of a typical butt weld as made by the invention;

Figs. 3, 4 and 5 are graphs illustrating certain principles hereinafter discussed relative to the practice of the invention; and Figs. 6, 7 and 8 are graphs further illustrating principles for practicing the invention.

Referring now to Fig. 1 in further detail, a pair of pipe ends which are to be butt welded together are shown at 10 and 11, the line of the desired butt weld being indicated at 12. These pipe ends may be held in position by suitable clamping means as at 13, 14, such as readily removable split clamps of any suitable known type having flanges secured thereto as at 15, 16 respectively, between which two or more fluid pressure piston and cylinder devices as at 17 and 18 are located. For example, these may be hydraulic power cylinders or gas pressure operated, and same, together with their piston means, as shown, are so connected to the flanges 15 and 16 that the pistons therein may be operated by the fluid pressure to pull the clamping means as well as the pieces of pipe toward each other with the pipe ends abutting each other under a suitable pressure which preferably may remain at the same predetermined value throughout the operation of making the weld.

A one-turn induction heating "coil" is provided at 20 having cooling fluid cavities therein, in known manner as indicated by the small circles, this coil encircling the zone of the desired weld in slightly spaced relation to the pipe ends. This coil may be of a known split type used for induction heating purposes, the ends of the turn respectively being connected to a high frequency generator by connections as schematically indicated at 21.

Preferably the zone of the desired weld is surrounded externally of the pipe ends by chamber means for containing an inert gas such as argon during the welding operation and to exclude from the pipe ends when heated, the oxygen of the surrounding atmosphere, this being desirable particularly if the pipe is formed of metals which become easily oxidized when heated to welding temperature. This chamber means may take the form schematically indicated, viz. a pair of insulating annular housing members as at 22, 23 with conduits communicating therewith as at 24, 25 for introducing and discharging flows of the inert gas. These housing members may, of course, be split and suitably clamped in place by means not shown, in such manner that they may readily be removed after the weld has been formed.

The mechanical parts above described, and supporting means therefor, may, of course, be constructed in a wide variety of ways depending upon the shape and size of the tubing to be welded and other factors such as convenience and economy, but Fig. 1 is intended to show somewhat schematically the essential parts and their general relationships.

In accordance with the preferred practice of the invention, means as above indicated, is preferably provided for automatically shutting off the heating current at the proper moment or at least diminishing the current so as to insure that the effective heating is continued. To accomplish this, preferably the movement of the pipe ends toward each other, when they become heated and softened, is utilized. That is, when the metal along the zone of the desired welding becomes heated to welding temperature throughout the depth of the wall of the pipe, the metal will then be somewhat softened, whereby the fluid pressure cylinders cause the pipe ends to move toward each other a short distance and when this occurs, various known forms of electrical control equipment may be utilized to cut off the heating current at exactly the right moment so that the upset at the weld will be confined to the exterior of the pipe ends, the heating being cut off prior to any substantial internal upset. With the arrangement shown, for example, a microswitch 30 is mounted upon one of the clamp parts or the flange therefor as at 15, in a position adapted to be engaged by an actuating rod 31 mounted on the corresponding part of the other clamping means in adjustable position, as by the use of the nuts and threads as at 32. Thus the actuation of the microswitch may be used for example to operate a relay 33 for shutting off the source of power from the high frequency generator. The position of the push rod 31 may, of course, be adjusted by trial to actuate the switch at the proper moment.

In order that the welding will be carried out in accordance with the invention as above summarized, there are various factors which should be taken into consideration as hereinafter explained.

First, there is the matter of the tube or pipe diameter. In a majority of cases it may be assumed that the diameter will be large, as compared with the wall thickness of the tubing, and this will enable the two abutting edges to be considered mathematically substantially as if they were the edges of flat slabs or strips. The tube diameter affects the total power in kilowatts required, but not the power density, i.e. kilowatts per square centimeter of surface.

The factors of wall thickness, current frequency, power density and the time of heating should all be considered. These four variables are interdependent, but should be considered together. To carry out the invention most efficiently, they should be so chosen that when welding temperature of the pipe ends is reached, the temperature differential between the outer and inner surfaces is sufficient whereby the pressure between the pipe ends will cause the desired outward upset, rather than any substantial inward upset, at the time the heating current is cut off. Tests of the invention have shown that this may be accomplished to a surprisingly effective and satisfactory degree contrary to what might normally be expected. In a typical test of the invention with saisfactory results, the pipe diameter was seven inches, with a one-quarter inch wall thickness and a 40 kilowatt generator as the source of current was used, having a frequency of about 9600 cycles per second, the heating being discontinued after from 55 to 65 seconds, the pressure between the abutting end surfaces being about 3000 pounds per square inch. With such rapid heating, and with current of such a frequency, the pipe ends may be brought to proper temperature for good forged type welding throughout, but with a temperature different at the inner portions and outer portions of the pipe wall, the outer portions being from 100 to 200° F. hotter than the inner portions at the time the heating is discontinued.

It should be noted that the frequency should be high enough so that the so-called "skin effect" of the high frequency current induced in the pipe ends, will be sufficient to produce an appreciably higher density of induced current in the outer surface portions than in the inner surface portions. This may be clarified by referring to the graphs of Figs. 3, 4 and 5. Fig. 3 shows a curve plotted in arbitrary units for the case of a very thick slab or wall of metal to be heated, or a case where the frequency is very high, as for example of the order of 100 to 450 kilocycles and which might be used for welding steel tubing if the wall thickness is not excessive. It will be noted that while at the outer surface the induced current is of high density, the density at succeeding depths below the outer surface rapidly falls off in the case of Fig. 3 (where the frequency is high and the wall depth or thickness substantial). And after a certain depth, the only means whereby, with such high frequencies, the temperature of the inner wall would rise at all, would be by thermal conduction through the metal of the tube wall.

Fig. 2 illustrates a desirable intermediate case, typical for efficient practice of the present invention. Here the current frequency and the wall thickness are such that there is current flowing (and therefore substantial heat development) through the entire thickness of the wall, yet the current density is appreciably higher at the outer surface than at the inner surface. The rate of heating at any point in the metal depends upon the square of the current density and in the usual case of pipes of normal wall thickness, the factors of frequency, time and power for the heating can be so chosen that the current density, as per Fig. 4, will be great enough both internally and externally of the wall surface to heat same to welding temperature, but with a sufficient difference in the temperatures of the inner and outer portions so that the inner portion is not softened enough to cause inward upset of the metal.

Fig. 5 illustrates an extreme case such as would occur if the frequency were too low or if the tube wall were too thin for effective carrying out of the invention. That is, in this type of case, the current density as indicated will be substantially uniform throughout the section so that the difference in heating rate between the inner and outer surfaces would be too small to control the upset in the direction desired.

It will be apparent that the heating time, wall thickness and power development in the workpieces, must be so related that sufficient heat energy (in British thermal units) is imparted to the mass to satisfy the well known relationship between mass heat, specific heat and mean temperature rise.

In Fig. 6, curves are shown in arbitrary units indicating the temperatures of the outer and inner surfaces after various time periods of heating. Fig. 6 is intended to show a case where there has been a somewhat maladjusted relationship of the four factors of heating time, thickness, frequency and power developed. In this figure the welding temperature range is indicated by the shaded area W. Here the outer surface is heated to a temperature too high for a good weld, at a time before the inner surface has not been heated to a temperature high enough for welding. In other words, the curves of this figure indicate that with a given amount of power developed, for example for a given wall thickness, the current frequency was too high (causing too great a temperature difference), also possibly with the heating time too short, or this could be a case where the power density was too high at the outer surface or the wall thickness too great for the other factors as chosen.

Fig. 7 illustrates the results of using a correct choice of adjustment of the four variables. Here the final temperature differential on the inner and outer walls is such that there are welding temperatures across the entire wall thickness while at the same time the outer surface is enough hotter and therefore softer than the inner surface, so that substantially all of the upset will take place outwardly.

Fig. 8 illustrates circumstances where the temperature differential between the outer and inner surfaces is too low. This could be caused by any combination of the following, viz.: frequency too low; power density too low (and as a result the heating time too long); or wall thickness too thin for the other conditions chosen. Heating as illustrated in Fig. 8 would result in substantially uniform temperature throughout the tube wall and the upset would tend to occur both inwardly and outwardly.

In the specific example above given, where the power output of the generator was indicated as 40 kilowatts, such power includes not only the power which heats the mass at the welding zone of the workpieces, but also such losses, of course, as radiation from the inner and outer surfaces, heat conducted away axially along the workpiece, as well as electrical losses in the inductor coil, the leads, transformer, capacitors etc. These losses will, of course, vary depending upon the characteristics of any particular set up of the apparatus. While desirable relationships for the factors of heating time, wall thickness, current frequency and power developed, may be mathematically estimated, taking into consideration these various losses and for various types of conditions, yet it has been found that in practice such mathematical computations of the relationships are not necessary, inasmuch as the adjustment of the various factors may quite readily and quickly be made by trial for a given set of conditions, and if optimum results are not obtained on the first trial, then by considering the factors above discussed, corrective adjustments may quickly be made. The following table gives the desirable relationship of the various factors for three different typical examples for which a current frequency of about 10,000 cycles per second was used:

| Pipe Dia., inches | Wall Thickness, inches | Pressure at abutting surfaces, lb./sq. inch | Approx. generator power, kw. | Amount linear travel, inches | Approx. Heating Time, Seconds |
|---|---|---|---|---|---|
| 7 | .25 | 3,000 | 40 | .3 | 60 |
| 10 | .5 | 3,000 | 30 | .3 | 240 |
| 7 | .125 | 3,000 | 80 | .3 | 15 |

With the figures of the above examples as a guide, the proper choice and relationship of the various factors may be readily interpolated, estimated and determined by trial for other pipe dimensions and other sizes of generators, etc.

While in the above specific examples, a frequency of 9600–10,000 cycles per second is specified, it will be understood that lower frequencies such as sometimes used for induction heating purposes may be used in some cases, particularly where the wall thickness is substantial. On the other hand, in other cases, particularly where the walls are relatively thin, considerably higher frequencies such as up to 50,000 or 100,000 cycles per second, or even higher, may be used, so long as the edge surfaces can thereby be heated throughout to welding temperature, but with a temperature differential as between external and internal portions of the edges sufficient to cause the bulging or upset, under the heating time and pressure conditions applied, all or largely to occur in the desired direction. Also, while in the above examples, the pressure of the abutting surfaces is given as 3000 pounds per square inch, this also may be varied, since with some metals a satisfactory forged type weld may be made under lesser pressures, and other metals, depending on their condition of treatment and the welding temperature required therefor, may preferably be welded with somewhat higher pressures.

Although certain particular embodiments of the invention are herein disclosed for purposes of explanation, further modifications thereof, after study of this specification, will be apparent to those skilled in the art to which the invention pertains. Reference should accordingly be had to the appended claims in determining the scope of the invention.

What is claimed and desired to be secured by Letters Patent is:

1. Method for butt welding together opposed ends of two pieces of pipe with the upset of the weld occurring on the exterior surfaces of the pipe and substantially to a negligible degree on the interior thereof, such method comprising: holding the pieces of pipe together end to end under pressure; utilizing an electromagnetic field externally of the pipe for inducing current in the walls of the abutting ends, of a frequency and power density to heat the surfaces of said ends rapidly throughout to welding temperature but with the temperature of the external portions of the ends somewhat higher than the temperature of the internal portions; maintaining such heating until said ends are softened to an extent that such pressure moves the pieces of pipe substantially toward each other; and utilizing such movement automatically to check the heating current and the resulting heating before the exterior portions of the abutting ends become substantially molten and before the metal is upset substantially inwardly of the pipe.

2. Method for butt welding together opposed ends of two pieces of pipe with the upset of the weld occurring at least largely on the exterior surfaces of the pipe, such method comprising: holding the pieces of pipe together end to end under pressure; utilizing an electromagnetic field externally of the pipe for inducing current in the walls of the abutting ends, of a frequency and power density to heat the surfaces of said ends rapidly throughout to welding temperature but with the temperature of the external portions of the ends somewhat higher than the temperature of the internal portions; maintaining such heating until said ends are softened to an extent that such pressure moves the pieces of pipe substantially toward each other and into welded-together relation; and discontinuing the heating before the inside surfaces of the pipe at the welded zone become substantially displaced.

3. Method for butt welding together opposed ends of two pieces of pipe with the upset of the weld occurring on the exterior surfaces of the pipe and substantially without upsetting on the interior thereof, such method comprising: holding the pieces of pipe together end to end under a predetermined pressure; utilizing an electromagnetic field externally of the pipe for inducing high frequency current in the walls of the abutting ends, of a frequency and power density to heat the surfaces of said ends rapidly throughout to welding temperature but with the temperature of the external portions of the ends somewhat higher than the temperature of the internal portions; maintaining such heating until said ends are softened to an extent that said pressure moves the pieces of pipe substantially toward each other and into welded-together relation; and utilizing such movement automatically to stop the heating current and the resulting heating before the exterior portions of the abutting ends become substantially molten and before the metal is upset substantially inwardly of the pipe.

4. Method for butt welding together opposed edges of two pieces of metal with the upset of the weld occurring on one of the surfaces of the welded zone and substantially without upsetting on the opposite surface, such method comprising: holding the pieces of metal together edge to edge under pressure; utilizing an electromagnetic field for inducing current in the metal at the zone of the abutting edges, of a frequency and power density to heat the edge surfaces rapidly throughout to welding temperature but with the temperature adjacent said one surface somewhat higher than the temperature adjacent said opposite surface; maintaining such heating until said edges are softened to an extent that said pressure moves the pieces substantially toward each other and into welded-together relation; and then discontinuing the heating before the metal at said opposite surface at the welded zone becomes substantially displaced.

5. Apparatus for butt welding together opposed ends of two pieces of pipe with the upset occurring at least largely on the exterior surface of the pipe, such apparatus comprising in combination: means for clamping respectively each of the pieces of pipe and for holding same in positions end to end; fluid-pressure means for forcing said clamping means toward each other under predetermined pressure, whereby the pipe ends engage each other under pressure; an induction heating coil mounted in a position to surround in closely-spaced relation the pipe ends as thus held together under pressure, for heating such ends by electromagnetic induction; a source of high frequency heating current adapted to be connected to said coil; switch means for discontinuing the supply of current from said source to the coil; and means mounted to be actuatable responsive to a predetermined relative movement of said clamping means toward each other responsive to said pressure upon heating and consequent softening of the pipe ends, for actuating said switch, thereby to discontinue the induction heating.

6. Apparatus for butt welding together opposed edges of two pieces of metal with the upset occurring at least largely on one of the surfaces of the welded zone and substantially without upsetting on the opposite surface, such apparatus comprising in combination: means for clamping respectively each of the pieces of metal and for holding same in positions edge to edge; means for forcing said clamping means toward each other under predetermined pressure, whereby said edges engage each other under pressure; an induction heating coil mounted in closely-spaced relation to the zone of the abutting edges as thus held together under pressure for heating such edges by electromagnetic induction; a source of high frequency heating current adapted to be connected to said coil; switch means for discontinuing the supply of current from said source to the coil; and means mounted to be actuatable responsive to a predetermined relative movement of the pieces toward each other responsive to said pressure and upon heating and consequent softening of said edges, for actuating said switch, thereby to discontinue the induction heating.

References Cited in the file of this patent

UNITED STATES PATENTS

| | | |
|---|---|---|
| 1,220,848 | Holmes | Mar. 27, 1917 |
| 2,018,379 | Pfeiffer | Oct. 22, 1935 |
| 2,542,393 | Chapman | Feb. 20, 1951 |
| 2,649,527 | Chapman | Aug. 18, 1953 |
| 2,805,315 | Chapman | Sept. 3, 1957 |